US008128544B2

(12) United States Patent
Cote et al.

(10) Patent No.: US 8,128,544 B2
(45) Date of Patent: Mar. 6, 2012

(54) LOW INERTIA ROLL

(75) Inventors: Kevin Lauren Cote, Durham, NH (US); Jonathan Michael Villeneuve, Madbury, NH (US)

(73) Assignee: Goss International Americas, Inc., Durham, NH (US)

( * ) Notice: Subject to any disclaimer, the term of this patent is extended or adjusted under 35 U.S.C. 154(b) by 1255 days.

(21) Appl. No.: 10/968,573

(22) Filed: Oct. 19, 2004

(65) Prior Publication Data

US 2005/0054500 A1 Mar. 10, 2005

Related U.S. Application Data

(62) Division of application No. 10/005,660, filed on Nov. 2, 2001, now Pat. No. 6,851,188.

(51) Int. Cl.
*F16C 13/00* (2006.01)

(52) U.S. Cl. .......................................... 492/44; 492/45

(58) Field of Classification Search .................... 492/44, 492/35, 46, 45; 165/90
See application file for complete search history.

(56) References Cited

U.S. PATENT DOCUMENTS

| | | | | |
|---|---|---|---|---|
| 1,530,285 | A | 3/1925 | Allen | |
| 1,689,568 | A | 10/1928 | Wade | |
| 2,372,795 | A | 4/1945 | Rodeck | |
| 2,790,628 | A | 4/1957 | Barnes | |
| 3,362,058 | A | 1/1968 | Morris et al. | |
| 3,447,599 | A * | 6/1969 | Smith | 165/89 |
| 3,548,929 | A * | 12/1970 | Gross | 165/89 |
| 3,550,235 | A | 12/1970 | Jarvis et al. | |
| 3,789,786 | A | 2/1974 | Wiedenmann et al. | |
| 4,104,772 | A | 8/1978 | Sailas | |
| 4,149,303 | A * | 4/1979 | Appenzeller | 492/35 |
| 4,176,270 | A | 11/1979 | Sailas | |
| 4,336,642 | A | 6/1982 | Engelberts | |
| 4,801,102 | A | 1/1989 | Bradlee | |
| 5,031,694 | A | 7/1991 | Lloyd | |
| 5,033,544 | A | 7/1991 | Abbott | |
| 6,080,258 | A | 6/2000 | Tittgemeyer | |
| 6,402,672 | B2 * | 6/2002 | Mornet et al. | 492/45 |
| 6,691,615 | B2 * | 2/2004 | Fukui | 101/409 |
| 6,851,188 | B2 * | 2/2005 | Cote et al. | 29/895.211 |
| 2001/0023223 | A1 * | 9/2001 | Mornet et al. | 492/45 |

* cited by examiner

*Primary Examiner* — Essama Omgba
(74) *Attorney, Agent, or Firm* — Davidson, Davidson & Kappel, LLC

(57) ABSTRACT

A roll for a rotary printing press having a first web disposed along a helical path and a plurality of first tabs disposed one after the other on the first web and extending from the first web at an angle relative to a surface of the first web. The first web forms one of a cylindrical inner wall and a cylindrical outer wall.

8 Claims, 4 Drawing Sheets

LOW INERTIA ROLL

CROSS-REFERENCE TO RELATED APPLICATIONS

This is a divisional of U.S. patent Ser. No. 10/005,660 filed Nov. 2, 2001 and hereby incorporated by reference herein.

BACKGROUND

The present invention relates generally to rotary printing presses, and particularly to a low inertia roll for a rotary printing press.

In the printing press technology, rolls having a low moment of inertia are desirable in a variety of applications. Such low inertia rolls are used as web-driven idler rolls and other rolls subjected to high accelerations and decelerations.

Low density materials may be used to produce low inertia rolls. Such low density materials include carbon fiber, aluminum and magnesium. However, such materials may be prohibitively expensive and/or lack the strength required. Strong, inexpensive materials, such as steel, have been used to produce low inertia rolls by providing voids in the roll wall to reduce the moment of inertia of the roll. Such voids are typically formed by removing material from the roll. Unfortunately, the process of forming the voids can be slow and expensive, with a large percentage of wasted material.

SUMMARY OF THE INVENTION

The present invention provides a method for making a roll for a rotary printing press. The method includes cutting a first strip of a first material so as to form a first web with a plurality of first tabs disposed one after the other and extending from the first web; bending the plurality of first tabs relative to the first web so as to form a first strut strip having the first tabs extending from the first web at an angle relative to a surface of the first web; and wrapping the first strut strip about a cylindrical form, the strut strip following a helical path about the cylindrical form so as to form a cylindrical tube with the plurality of first tabs projecting therefrom.

A method according to an embodiment of the present invention may further include gluing adjacent wraps of the first web to each other.

A second strip of a second material may be wrapped about the cylindrical form so as to form a substrate for the first web.

A layer of an adhesive may be applied to the substrate before the wrapping the first web. Moreover, the substrate may form an inner wall of the roll.

The first web may form an inner wall of the roll.

A method according to an embodiment of the present invention may further include wrapping a third strip of a third material about projecting ends of the plurality of first tabs so as to form a cylindrical outer wall disposed at a distance from the wrapped first web, the plurality of first tabs extending between the wrapped first web and the wrapped third strip.

The bending of the plurality of first tabs relative to the first web may be performed so as to form a plurality of straight first tabs projecting at an acute angle from the surface of the first web and a plurality of bent first tabs projecting generally perpendicularly from the surface of the first web. The plurality of bent first tabs may include respective bent end portions projecting generally parallel to the surface of the first web and away from the straight first tabs, the straight and bent first tabs projecting from the first web in an alternating fashion.

A method according to an embodiment of the present invention may further include cutting a fourth strip of a fourth material so as to form a second web with a plurality of second tabs disposed one after the other and extending from the second web. The plurality of second tabs may be bent relative to the second web so as to form a second strut strip with the plurality of second tabs extending from the second web at an angle relative to a surface of the second web. The bending may be performed so as to form a plurality of straight second tabs projecting at an acute angle from the surface of the second web and a plurality of bent second tabs projecting generally perpendicularly from the surface of the second web, with the plurality of bent second tabs including respective bent end portions projecting generally parallel to the surface of the second web and away from the straight second tabs. The straight and bent second tabs may project from the second web in an alternating fashion. Moreover, the embodiment may include wrapping the second strut strip about the cylindrical form with the second strut strip following the helical path about the cylindrical form.

A fifth strip of a fifth material may be wrapped about the cylindrical form before the wrapping the first strut strip and the second strut strip so as to form an inner wall of the roll.

The wrapping of the first strut strip and the wrapping of the second strut strip may be performed so as to interlock the straight first and second tabs in an alternating fashion, the respective bent end portions of the bent first tabs projecting away from the respective bent end portions of the bent second tabs.

Before the wrapping of the first strut strip and the wrapping of the second strut strip, the first strut strip and the second strut strip may be disposed so as to interlock the straight first and second tabs in an alternating fashion, the respective bent end portions of the bent first tabs projecting away from the respective bent end portions of the bent second tabs.

A sixth strip of a sixth material may be disposed at the first and second webs before the wrapping the first strut strip and the wrapping the second strut strip.

A seventh strip of a seventh material may be disposed at the bent second and fourth tabs before the wrapping the first strut strip and the wrapping the second strut strip.

Before the wrapping the first strut strip and the wrapping the first strut strip and the wrapping the second strut strip, a sixth strip of a sixth material may be disposed at the first and second webs, and a seventh strip of a seventh material may be disposed at the bent second and fourth tabs.

The present invention also provides a roll for a rotary printing press. The roll includes a first web disposed along a helical path so as to form a tube, and a plurality of first tabs disposed one after the other and extending from the first web at an angle relative to a surface of the first web.

The apparatus and method according to the present invention provide a way of relatively inexpensively producing high strength, low inertia rolls. The tabs form struts between inner and outer walls, providing for high strength in the roll. The relatively large voids in the roll wall formed between tabs provide for low inertia.

BRIEF DESCRIPTION OF THE DRAWINGS

The present invention is elaborated upon below with reference to the accompanying drawings.

DETAILED DESCRIPTION

Figure 1:
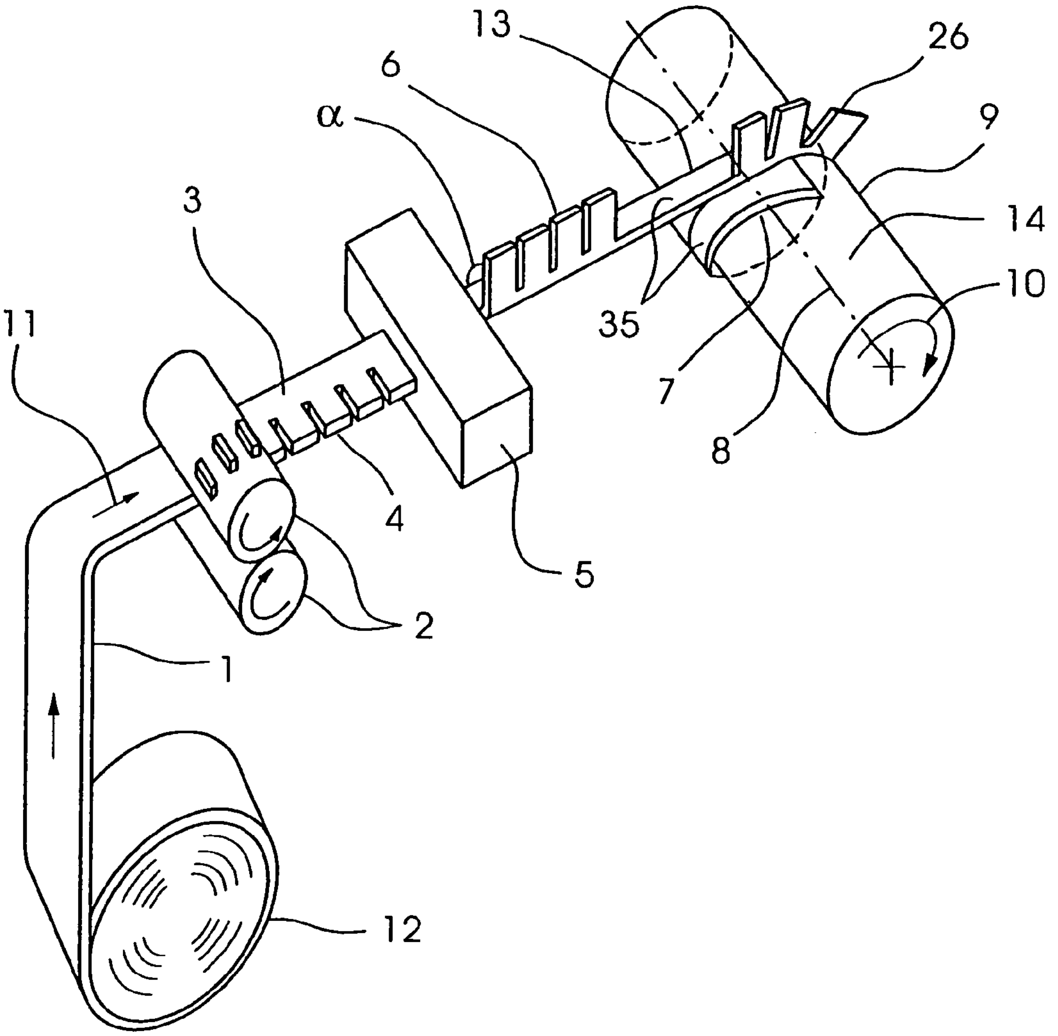
FIG. 1 shows a schematic perspective view of an apparatus for making a roll.

Referring to FIG. 1, a perspective view of an apparatus for making a roll is shown. Strip of material 1 is fed in direction 11 from supply roll 12. Strip of material 1 is processed in a continuous fashion. Die cutting cylinders 2 partially cut strip of material 1 such that there remains a connected web 3 connected to tabs 4. Next, tabs 4 are bent relative to web 3 in a forming operation in forming section 5 to produce structured strip 13 having tabs 6 projecting away from the web at angle α. In FIG. 1, tabs 4 are shown bent approximately perpendicular to web 3, i.e., angle α is approximately 90°. Structured strip 13 is then wrapped around mandrel 9 that is rotating in direction 10 so as to form a plurality of adjacent wraps 35. Structured strip 13 is wrapped around mandrel 9 with web 3 tangent to surface 14 of mandrel 9. As structured strip 13 is wrapped around mandrel 9, tabs 6 are forced into a substantially radial orientation relative to the mandrel, with projecting ends 26 pointing away from the mandrel. Structured strip 13 follows a generally helical path 7 along longitudinal axis 8 of mandrel 9 as the mandrel rotates so as to form a cylindrical tube, similar to composite roll 33, shown in FIG. 4.

Strip of material 1 may be made of any suitable material, such as steel, for example, or of a composite of materials. Though a continuous strip of material 1 may be used, in certain embodiments of the present invention, a plurality of strips of material 1 each having a finite length may be used in a serial process in which the finite lengths are sequentially wrapped around mandrel 9.

FIG. 1 shows die cutting cylinders 2 for cutting strip of material 1. In other embodiments of the present invention, other types of cutting devices may be used to from tabs 4 and connected web 3.

Forming section 5, used to bend tabs 4 relative to web 3, may be any type of device suitable for bending the material of strip of material 1. Suitable bending devices include sheet metal brakes and bending levers, for example. Such devices and their use in forming techniques would be familiar to one of skill in the art.

While angle α is depicted in FIG. 1 as being approximately 90°, in other embodiments of the present invention, tabs 4 may be bent at any of a variety of angles relative to web 3, i.e., angle α may range between 0° and 180°.

Mandrel 9 may be any suitable generally cylindrical form suitable for supporting and facilitating the wrapping of structured strip 13. Any suitable winding system may be used to perform the wrapping operation, a variety of which will be known to those of skill in the art. For example, a pendulum support system such as that disclosed in U.S. Pat. No. 6,080,258, assigned on its face to applicant and which is hereby incorporated by reference herein, may be employed.

One or more adhesives may be applied between adjacent wraps 35 of structured strip 13 so as to form a rigid tube or roll. Also, one or more layers of a material may be wrapped onto mandrel 9 before wrapping structured strip 13 so as to form a substrate for the strip and/or provide additional structural support for the final roll. Moreover, one or more layers of a material may be wrapped onto projecting ends 26 of tabs 6 so as to form an outer wall of the final roll. One or more adhesives may be employed between the various layers and between structured strip 13 and the layers as necessary. In certain embodiments of the present invention, adjacent wraps of material may be welded together. Moreover, a variety of strengtheners, surface treatments, etc., may be employed to produce a suitable final roll. Details of such adhesives, welding, strengtheners, treatments, etc., will be apparent to those of skill in the art, and need not be elaborated upon here.

Figure 2:
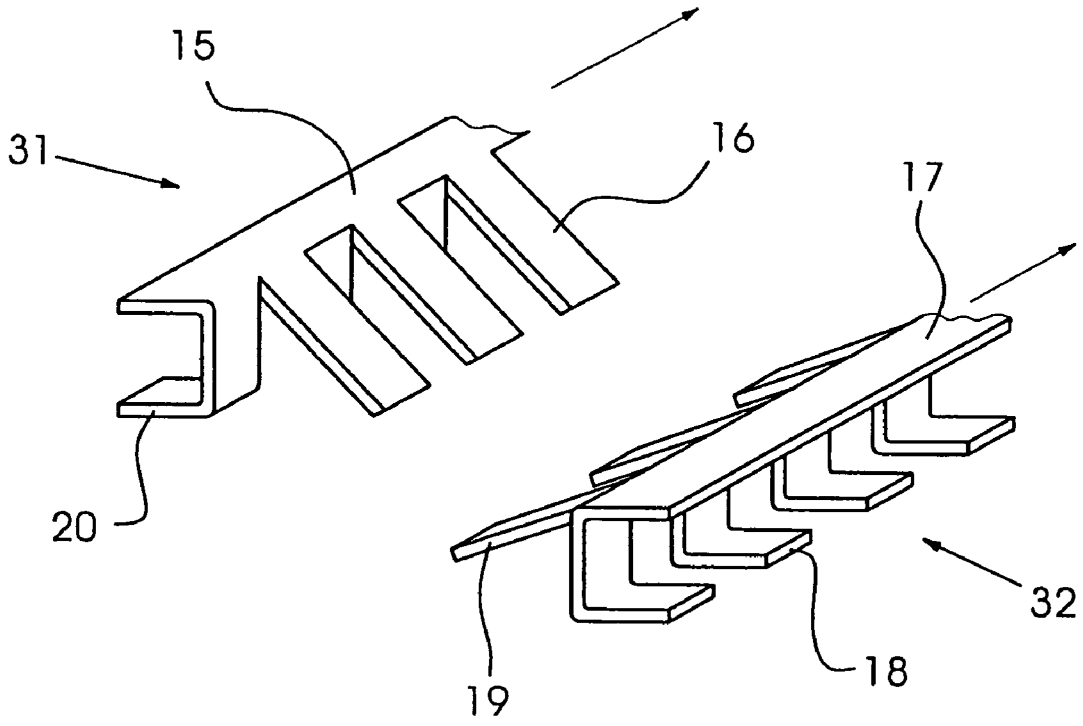
FIG. 2 shows a perspective view of a two components for making a roll.

FIG. 2 shows a perspective view of two components for making a roll according to another embodiment of the present invention. Left-hand component 31 includes continuous web section 15, and alternating straight tabs 16 and bent tabs 20. Right-hand component 32 includes continuous web section 17, straight tabs 19 and bent tabs 18. Left-hand component 31 and right-hand component 32 may be cut and formed in a process similar to that described above with reference to FIG. 1. In FIG. 2, straight tabs 16 are shown alternating, one after the other, with bent tabs 20. In other embodiments of the present invention, one straight tab 16 may be followed by two bent tabs 20, for example, or vice-versa. Similarly, straight tabs 19 and bent tabs 18 of right-hand component 32 may be arranged in a variety of alternating configurations. Many variations are possible within the scope of the present invention.

Figure 3:
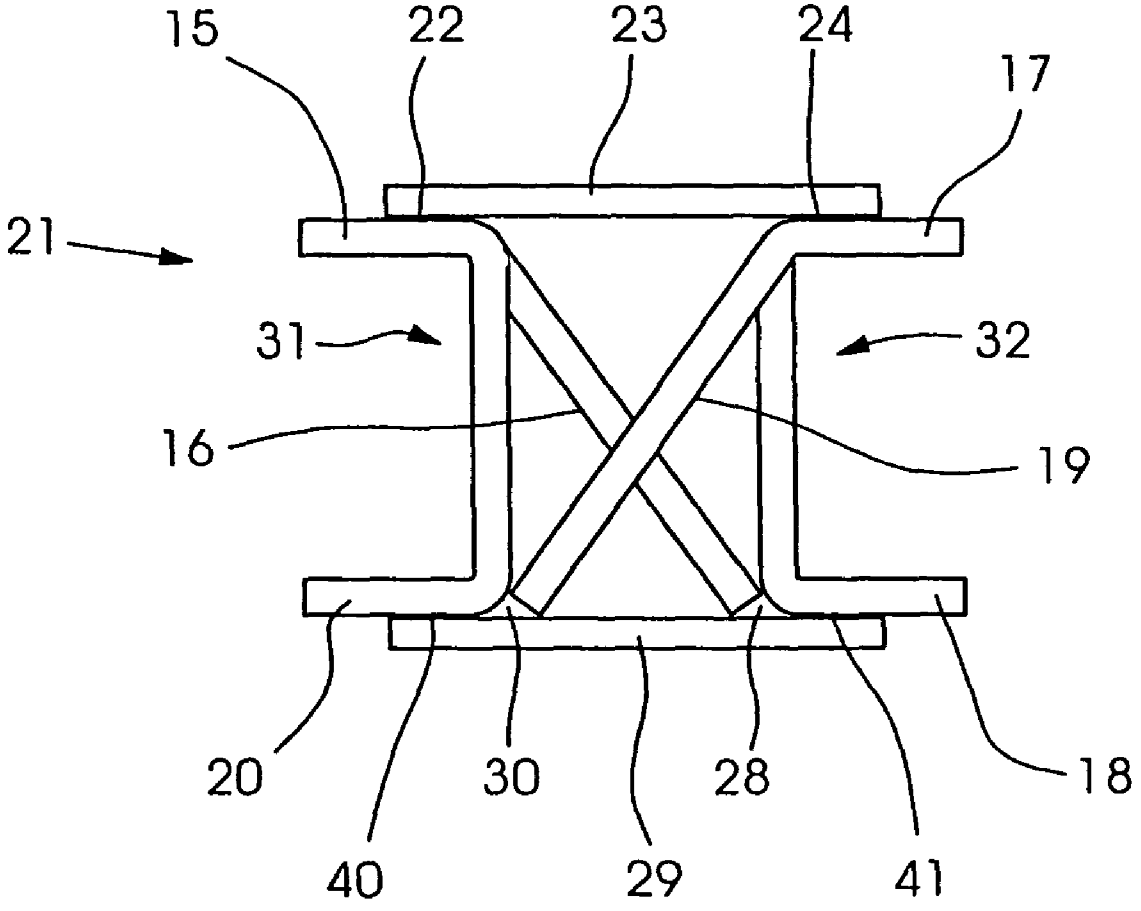
FIG. 3 shows a cross-sectional view of a composite strut member having the two component shapes shown in FIG. 2 interlocked between an inner and an outer band.

FIG. 3 shows a cross-sectional view of a composite strut member 21 formed by left and right-hand component shapes 31 and 32, respectively, shown in FIG. 2, interlocked between bands 23 and 29. Left-hand component 31 is disposed relative to right-hand component 32 so that straight tabs 16 of left-hand component 31 interlock, i.e., are nested side-by-side in an alternating fashion, with straight tabs 19 of right-hand component 32. Straight tabs 16 and straight tabs 19 form a crossing pattern as shown in FIG. 3. The specific nested pattern of straight tabs 16 and 19 and bent tabs 18 and 20, i.e., the number of straight tabs 16 that are adjacent to a straight tab 19, or to a number of straight tabs 19, etc., depends on the specific configuration of left and right-hand components 31 and 32, respectively. As discussed above, and as would be apparent to those of skill in the art, many variations for the configurations of left and right-hand components 31 and 32 are possible within the scope of the present invention.

Bands 23 and 29, respectively, are provided for holding left-hand component 31 and right-hand component 32 together and adding structural support. Continuous web section 15 of left-hand component 31 is secured to band 23 at interface 22, and continuous web section 17 of right-hand component 32 is secured to band 23 at interface 24. Bent tabs 20 of left-hand component 31 are secured to band 29 at interface 40, while bent tabs 18 of right-hand component 32 are secured to band 29 at interface 41. Straight tabs 16 of left-hand component 31 are secured to band 29 at interface 28, while straight tabs 19 of right-hand component 32 are secured to band 29 at interface 30. An adhesive or other appropriate joining device may be employed at interfaces 15, 17, 40, 41, 28 and 30 to effect the securing. Left and right-hand components 31 and 32, as well as bands 23 and 29, may be made out of any suitable material or combinations of materials. Suitable materials include steel and plastics, for example.

Figure 4:
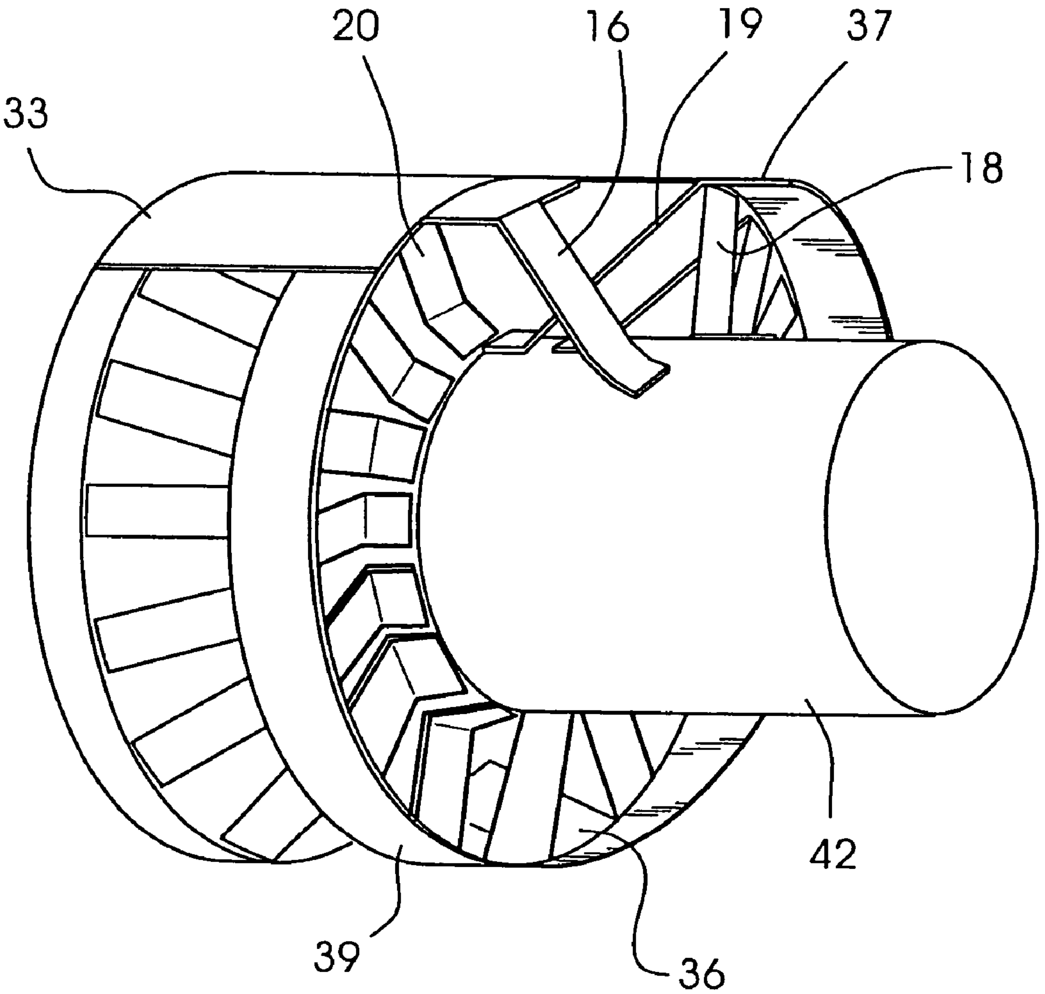
FIG. 4 shows a perspective, partially cut-away view of a composite roll formed using the composite strut member shown in FIG. 3.

FIG. 4 shows a perspective, partially cut-away view of a composite roll 33 formed using composite strut member 21 shown in FIG. 3. Composite roll 33 includes outer wall 37, inner wall 38, tubular interior space 38 being formed inside inner wall 42. Voids 36 are formed between straight tabs 16 and 19 and/or bent tabs 18 and 20. To form composite roll 33, composite strut member 21 may first be formed from left-hand component 31, right-hand component 32, band 23 and band 29, then the composite strut member wrapped around mandrel 9, as described above with reference to FIG. 1. If composite strut member 21 is wrapped with band 29 to the inside, then band 29 forms inner wall 42 of composite roll 33 and band 23 forms outer wall 37 of the composite roll. If composite strut member 21 is wrapped with band 23 to the inside, then band 23 forms inner wall 42 and band 29 forms outer wall 37 of composite roll 33.

A variety of processes, and a variety of ordering of process steps, may be used to produce composite roll 33. For example, in some embodiments of the present invention, left and right-hand components 31 and 32 may be wrapped sequentially. Band 29 may be first laid down on mandrel 9 in a wrapping process, and a layer of adhesive applied to the band. Then, for example, left-hand component 31 may be wrapped onto band 29. Next, right-hand component 32 may be wrapped onto band 29 so that straight tabs 16 interlock with straight tabs 19. A layer of adhesive may be applied to continuous web sections 15 and 17, and band 23 then wrapped onto the continuous web sections to form composite roll 33. Additional layers of material, as well as various adhesives, strengtheners, surface treatments, etc., may be employed, as discussed above with reference to FIG. 1.

In certain embodiments of the present invention, a cooling fluid may be passed through interior 38 of composite roll 33, or through voids 36 formed between straight tabs 16 and 19 and/or bent tabs 18 and 20. Straight tabs 16 and 19 and/or bent tabs 18 and 20 may be used to conduct heat from outer wall 37 of composite roll 33 to the cooling fluid. Moreover, the cooling fluid could be used to transfer heat from inner wall 42, for example to dissipate heat from bearings (not shown) associated with composite roll 33.

It will of course be understood that the present invention has been described above only by way of example and that modifications of details can be made within the scope of the invention.

What is claimed is:

1. A roll for a rotary printing press, the roll comprising:

a first web disposed along a helical path;

a plurality of first tabs disposed one after the other on the first web and extending from the first web at an angle relative to a surface of the first web;

a cylindrical outer wall and a cylindrical inner wall; and the first web forming or contacting one of the cylindrical inner wall and the cylindrical outer wall, and the first tabs contacting the other of the cylindrical inner wall and the cylindrical outer wall, the first web and first tabs defining a strut supporting the cylindrical outer wall on the cylindrical inner wall.

2. The roll as recited in claim 1 wherein the first web forms the cylindrical inner wall, the cylindrical outer wall being disposed at ends of the plurality of first tabs, the plurality of first tabs extending between the cylindrical inner wall and the cylindrical outer wall.

3. The roll as recited in claim 1 wherein the plurality of first tabs includes a plurality of straight first tabs extending at an acute angle from the surface of the first web and a plurality of bent first tabs extending generally perpendicularly from the surface of the first web and having respective bent end portions extending generally parallel to the surface of the first web and away from the straight first tabs, wherein the straight and bent first tabs project from the first web in an alternating fashion, and further comprising:

a second web disposed along the helical path; and a plurality of second tabs disposed one after the other and extending from the web at an angle relative to a surface of the second web, the plurality of second tabs including a plurality of straight second tabs extending at an acute angle from the surface of the second web and a plurality of bent second tabs extending generally perpendicularly from the surface of the second web, the plurality of bent second tabs including respective bent end portions extending generally parallel to the surface of the second web and away from the straight second tabs, wherein the straight and bent second tabs project from the second web in an alternating fashion;

wherein the first web and the second web are disposed so that the straight first and second tabs interlock in an alternating fashion, the respective bent end portions of the bent first tabs extending away from the respective bent end portions of the bent second tabs.

4. The roll as recited in claim 3 wherein the cylindrical outer wall is disposed at respective second surfaces of the first and second webs; and the cylindrical inner wall is disposed at respective surfaces of the first and second bent tabs;

wherein the plurality of first and second tabs extend between the cylindrical outer and inner walls.

5. A roll for a rotary printing press, the roll comprising:

a first web disposed along a helical path;

a plurality of first tabs disposed one after the other on the first web and extending from the first web at an angle relative to a surface of the first web; and a cylindrical outer tube disposed over and contacting the first tabs, the first web and first tabs defining a strut supporting the cylindrical outer tube.

6. The roll as recited in claim 5 wherein the first web forms an inner cylindrical wall.

7. A roll for a rotary printing press, the roll comprising:

a first web disposed along a helical path; and a plurality of first tabs disposed one after the other on the first web and extending from the first web at an angle relative to a surface of the first web;

the first web forming one of a cylindrical inner wall and a cylindrical outer wall;

wherein the plurality of first tabs includes a plurality of straight first tabs extending at an acute angle from the surface of the first web and a plurality of bent first tabs extending generally perpendicularly from the surface of the first web and having respective bent end portions extending generally parallel to the surface of the first web and away from the straight first tabs, wherein the straight and bent first tabs project from the first web in an alternating fashion, and further comprising:

a second web disposed along the helical path; and a plurality of second tabs disposed one after the other and extending from the web at an angle relative to a surface of the second web, the plurality of second tabs including a plurality of straight second tabs extending at an acute angle from the surface of the second web and a plurality of bent second tabs extending generally perpendicularly from the surface of the second web, the plurality of bent second tabs including respective bent end portions extending generally parallel to the surface of the second web and away from the straight second tabs, wherein the straight and bent second tabs project from the second web in an alternating fashion;

wherein the first web and the second web are disposed so that the straight first and second tabs interlock in an alternating fashion, the respective bent end portions of the bent first tabs extending away from the respective bent end portions of the bent second tabs.

8. The roll as recited in claim 7 wherein the cylindrical outer wall is disposed at respective second surfaces of the first and second webs; and the cylindrical inner wall is disposed at respective surfaces of the first and second bent tabs;

wherein the plurality of first and second tabs extend between the cylindrical outer and inner walls.

* * * * *